United States Patent
Dharanipragada et al.

(10) Patent No.: US 6,813,624 B1
(45) Date of Patent: Nov. 2, 2004

(54) METHOD AND APPARATUS FOR ARCHIVAL AND RETRIEVAL OF MULTIPLE DATA STREAMS

(75) Inventors: Satya Dharanipragada, Ossining, NY (US); Jayashree Subrahmonia, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 09/721,897

(22) Filed: Nov. 25, 2000

(51) Int. Cl.⁷ .............................................. G06F 17/30
(52) U.S. Cl. ...................................................... 707/204
(58) Field of Search ........................ 707/204; 704/243; 386/95

(56) References Cited

U.S. PATENT DOCUMENTS

| | | | | |
|---|---|---|---|---|
| 6,023,710 A | * | 2/2000 | Steiner et al. | 707/204 |
| 6,078,933 A | * | 6/2000 | Szalwinski | 707/204 |
| 6,434,520 B1 | * | 8/2002 | Kanevsky et al. | 704/243 |
| 6,453,119 B1 | * | 9/2002 | Maruyama et al. | 386/95 |

* cited by examiner

*Primary Examiner*—Greta Robinson
*Assistant Examiner*—Sathyanarayan Pannala
(74) *Attorney, Agent, or Firm*—Ference & Associates

(57) ABSTRACT

Methods and apparatus for the processing, archival and retrieval of multiple data streams that are captured by multiple input modalities. A processing method preferably transforms the captured data into a form that is acceptable for the compatible archival method.

21 Claims, 1 Drawing Sheet

METHOD AND APPARATUS FOR ARCHIVAL AND RETRIEVAL OF MULTIPLE DATA STREAMS

FIELD OF THE INVENTION

The present invention relates to methods and apparatus for the processing, archival and retrieval of multiple data streams.

BACKGROUND OF THE INVENTION

There exist "events" for which one can envision having several possible streams of data describing the event. For example, a user can have audio, video and his/her handwritten notes of a lecture or a meeting in digital ink. Similarly a radiologist when dictating a report can simultaneously fill out a patient form in digital ink and also mark-up the relevant X-rays or MRI images.

A need has thus been recognized in connection with providing for the archival and retrieval of multiple input streams in an efficient and effective manner.

SUMMARY OF THE INVENTION

In accordance with at least one presently preferred embodiment of the present invention, there are broadly contemplated herein methods and apparatus for the processing, archival and retrieval of multiple data streams that are captured by multiple input modalities. A processing method preferably transforms the captured data into a form that is acceptable for the compatible archival method.

The aforementioned transformation is preferably accomplished by assigning tags to different portions of the data stream that describe the information contained in the data stream. The archival method imposes a structure on the captured data and computes archival tags from that are useful for retrieval of data from the event. The retrieval mechanism then enables the user to retrieve the archived events based on archival tags.

In one aspect, the present invention provides a method of providing the archival and retrieval of multiple data streams, the method comprising the steps of: inputting at least two data streams; designating at least one archival tag for each of the data streams; organizing the data streams via the use of at least one archival tag.

In another aspect, the present invention provides an apparatus for providing the archival and retrieval of multiple data streams, the apparatus comprising: an input arrangement which accepts at least two data streams; a designating arrangement which designates at least one archival tag for each of the data streams; an organizing arrangement which organizes the data streams via the use of at least one archival tag.

Furthermore, in another aspect, the present invention provides a program storage device readable by machine, tangibly embodying a program of instructions executable by the machine to perform method steps for providing the archival and retrieval of multiple data streams, the method comprising the steps of: inputting at least two data streams; designating at least one archival tag for each of the data streams; organizing the data streams via the use of at least one archival tag.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
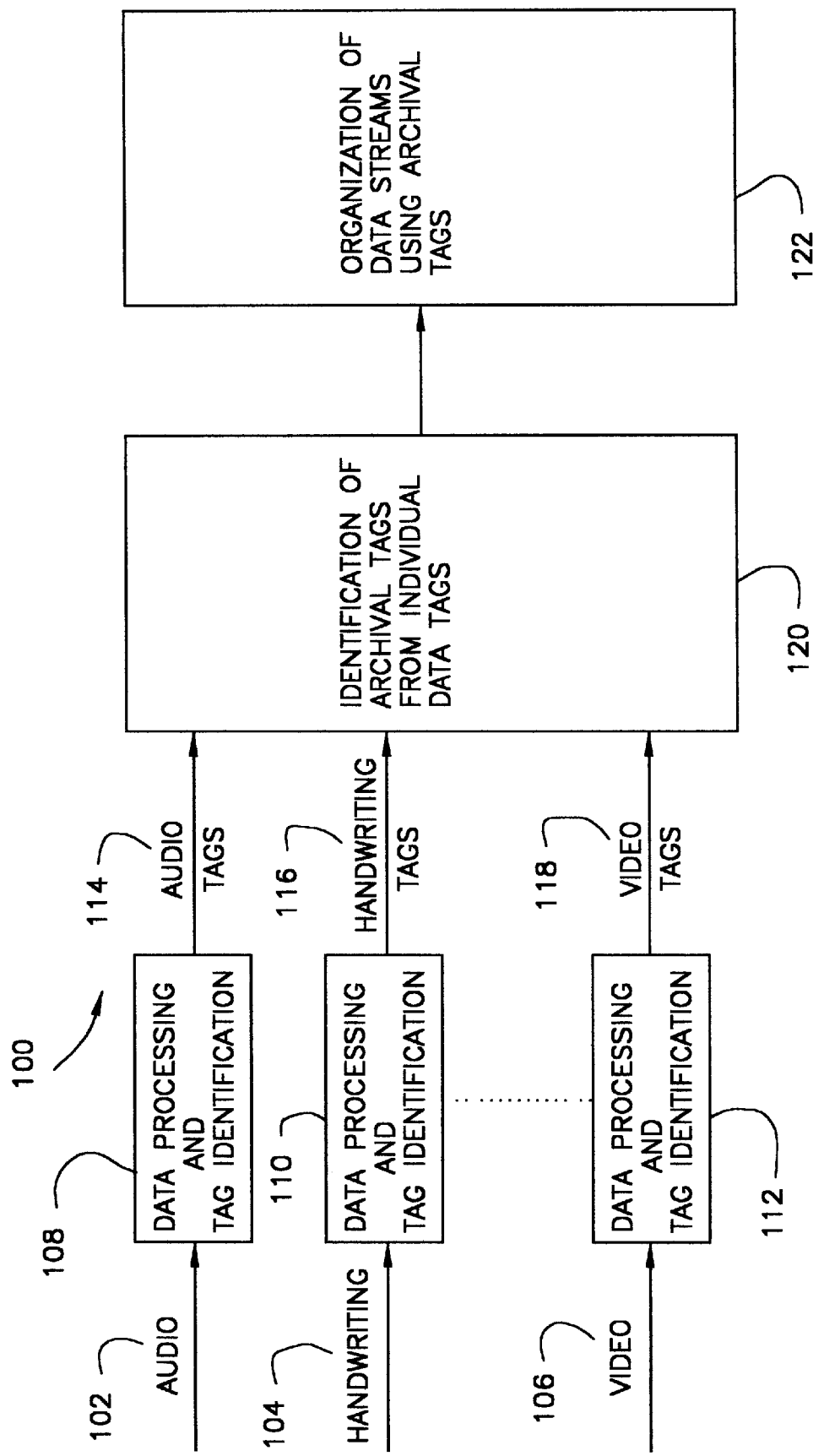
FIG. 1 provides a schematic illustration of an archiving and retrieval process.

As discussed previously, one can envision "events" in which multiple data streams may be used to describe the event. Accordingly, the retrieval of information for such events will then involve retrieving all data streams that contain similar information. For example, when retrieving lecture notes on a certain subject, it is conceivably that one might like to retrieve handwriting, audio and in some cases video streams pertaining to that subject.

FIG. 1 provides a schematic illustration of an archiving and retrieval process 100 in accordance with a presently preferred embodiment of the present invention. As shown in purely illustrative fashion, there may be three input data streams 102, 104, 106. As an example, these could correspond to audio input, handwriting input and video input, respectively.

Each of the three streams 102, 104, 106 is preferably fed into a corresponding "data processing and tag identification" module 108, 110, 112. Modules 108, 110 and 112 preferably process the data (102, 104, 106) in order to convert the same into a form needed for forming corresponding identifying tags 114, 116, 118, and for the identification of relevant tags (at step 120). Examples of identifying tags may be, but are not limited to, recognition output, time stamps for different portions of the data streams, key identifiers of the data stream, etc.

At step 120, archival tags are preferably identified. Particularly, process module 120 preferably serves to identify sets of tags from the different data streams that refer to similar information and to identify archival-tags that describe the content of the information in a generic form useful in retrieval. The output of this module is thus a set of archival tags which, as shown, preferably progress further in a single stream.

At step 122, data streams are preferably organized by using archival tags. Particularly, at process module 122, the individual data streams are preferably accepted and thence organized them based on archival tags. The user can then navigate through the data streams using the archival tags.

It may thus now be appreciated that, in accordance with at least one presently preferred embodiment of the present invention, at least the following three functions will be facilitated: data processing and tag identification; archival tag identification; and the organization of multiple data streams.

In accordance with at least one embodiment of the present invention, data processing involves extracting information from the data that is relevant for tag identification. Tags are descriptors of information contained in the data. One example of tags is the recognition text. Data processing in this case involves extracting features from the data that are necessary for recognition. An example of recognition features for audio data are: user identity, speech/non-speech classification and cepstral coefficients. For handwriting data, this might be geometric features that describe the local geometry of handwriting, as discussed in the following publications: L. Schomaker, "From handwriting analysis to pen-computer applications", Electronics and Communication Engineering Journal, June 1998, pp. 93–101, R. Plamandon et al., "Online Handwriting Recognition", Wiley Encyclopedia of Electrical and Electronics Engineering, Dept. of Electrical and Computer Engineering, U. of Wisconsin-Madison, 1999; K. Nathan et al., "Real-Time On-Line Unconstrained Handwriting Recognition Using Statistical Methods", Proceedings of ICASSP (Intl. Conference on Acoustics, Speech and Signal Processing), Detroit, 1995; and J. Subrahmonia et al., "Writer Dependent Recognition of On-Line Unconstrained Handwriting", Proceedings of ICASSP, Atlanta, Ga., 1996. Tags can also be manually assigned to portions of the data stream. Examples of this are tagging portions of handwritten ink as a keyword, to-do or appointment by encircling the piece of ink to be tagged; identifying the start and end of the audio to be tagged; or identifying scene change tags in a video stream. Thus, tag identification is done by a combination of manual and automatic tagging schemes. Once the tags have been identified for the individual data streams, they need to clustered for archival and retrieval purposes.

Archival tags are preferably extracted from the individual data stream tags. In some cases, one of the data stream tags itself might be considered as an archival tag. In some other cases, a set of data stream tags can be used to extract archival tags. Some examples of archival tags that might be useful are "user identity", "time slice" and "topics".

For "user identity", all the data streams collected from a single user could be considered as a unit. In this case, the user identity tag from all the data streams are combined to form one user identity archival tag.

For "time slice", all the data streams collected over a certain time slice could be considered as one unit. In this case, the time-slice tag from all data streams are combined to form one time slice archival tag.

For "topics", all the data streams that refer to the same topic could be considered as a unit. In this case the individual recognition tags from all the data streams have to be processed to extract archival tags.

The disclosure now turns to descriptions of the archival tags listed above and techniques for how to compute them.

For "user identity", the identity of the user may obtained in different ways, such as:

having the user label the data with a user identity during data collection; or by way of automatic user identification methods using small portions of the data stream.

Once the user identity is available, all data associated with a particular user can be archived together.

For "time slice", if the data comes time-stamped, it can be hierarchically archived according to time. The level of granularity (i.e., the order of magnitude employed) could vary according to the application. For example, all events in a particular day could archived together, while within the day all events in a particular hour could be archived together, etc.

For "topics", it could be understood that an event may include a collection of topics. Therefore, as a first step towards organizing and archiving the data, it is conceivable to employ automatic methods to segment the data into its constituent topics. Topic labels (digital ink or audio manually tagged as topic names), if available, could act as topic markers. However, in the absence of such labels, topic segmentation and topic name identification could be performed on the text streams generated by automatic recognition methods. A segmentation algorithm could preferably employ information retrieval, statistical machine-learning and natural language processing methods. Two conceivable approaches to this problem are (1) decision trees for topic segmentation, as discussed in S. Dharanipragada et al., "Story Segmentation and Topic Detection for Recognized Speech" (Proceedings of Eurospeech, pp. 243–2438, Budapest, September 1999) and S. Dharanipragada et al., "Story Segmentation and Topic Detection in the Broadcast News Domain" (Proceedings of the DARPA Broadcast News Workshop, pp. 65–68, 1999), and (2) maximum-entropy models for topic segmentation, as discussed in D. Beeferman et al., "Statistical Models for Text Segmentation" (Machine Learning, vol. 34, pp. 1–34, 1999).

The organization of multiple data streams involves identifying whether or not two sets of archival tags are similar. An approach to measuring this similarity can be found in Dharanipragada et al., "Story Segmentation . . . Recognized Speech", supra.

Once the archival tags have been identified and data aligned to them to identify which portions of the data stream get aligned with the individual archival tags, the data can be organized in a number of different ways. The organization depends on the task and can either be done automatically or by the user. An exhaustive approach, in accordance with a presently preferred embodiment of the present invention, could be to organize the data as a tree, with every level of the tree organizing the data stream using one set of archival tags. The connections between the tree nodes indicate a relationship between the archival tags. Multiple trees would then provide different ways to traverse the tree with each being different compared to the other in the sequence of archival tags used during traversal.

Once the data has been organized in a tree form, the user can retrieve information from it by presenting a natural language query that gets translated into a set or archival tags, which could then be used by a conventional smart-search algorithm to traverse the trees.

It is to be understood that the present invention, in accordance with at least one presently preferred embodiment, includes an input arrangement which accepts at least two data streams, a designating arrangement which designates at least one archival tag for each of the data streams and an organizing arrangement which organizes the data streams via the use of at least one archival tag. Together, the input arrangement, designating arrangement and organizing arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing the archival and retrieval of multiple data streams, said method comprising the steps of:

inputting at least two data streams;

designating at least one archival tag for each of said data streams;

organizing said data streams via the use of at least one archival tag.

2. The method according to claim 1, further comprising the steps of:

assigning a set of at least one tag to each of said data streams;

said designating step comprising the designation of at least one archival tag among each set of at least one tag.

3. The method according to claim 2, wherein said step of designating at least one archival tag comprises designating a user identity tag.

4. The method according to claim 3, wherein said step of designating a user identity tag comprises labeling data from the corresponding data stream with a user identity.

5. The method according to claim 4, wherein said labeling step is manually carried out.

6. The method according to claim 4, wherein said labeling step is automatically carried out.

7. The method according to claim 2, wherein said step of designating at least one archival tag comprises designating a time slice tag.

8. The method according to claim 7, wherein said step of designating a time slice tag comprises time-stamping data from the corresponding data stream.

9. The method according to claim 2, wherein said step of designating at least one archival tag comprises designating a topics tag.

10. The method according to claim 1, wherein said organizing step comprises ascertaining similarities between two sets each comprising at least one archival tag.

11. An apparatus for providing the archival and retrieval of multiple data streams, said apparatus comprising:

an input arrangement which accepts at least two data streams;

a designating arrangement which designates at least one archival tag for each of said data streams;

an organizing arrangement which organizes said data streams via the use of at least one archival tag.

12. The apparatus according to claim 11, further comprising:

an assigner which assigns a set of at least one tag to each of said data streams;

said designating arrangement being adapted to designate at least one archival tag among each set of at least one tag.

13. The apparatus according to claim 12, wherein said designating arrangement is adapted to designate at least one user identity tag in designating at least one archival tag.

14. The apparatus according to claim 13, wherein said designating arrangement is adapted to label data from the corresponding data stream with a user identity in designating at least one user identity tag.

15. The apparatus according to claim 14, wherein said designating arrangement is adapted to permit manual labelling of data from the corresponding data stream with a user identity.

16. The apparatus according to claim 14, wherein said designating arrangement is adapted to automatically label data from the corresponding data stream with a user identity.

17. The apparatus according to claim 12, wherein said designating arrangement is adapted to designate a time slice tag in designating at least one archival tag.

18. The apparatus according to claim 17, wherein said designating arrangement is adapted to time-stamp data from the corresponding data stream in designating a time slice tag.

19. The apparatus according to claim 12, wherein said designating arrangement is adapted to designate a topics tag in designating at least one archival tag.

20. The apparatus according to claim 11, wherein said organizing arrangement is adapted to ascertain similarities between two sets each comprising at least one archival tag.

21. A program storage device readable by machine, tangibly embodying a program of instructions executable by the machine to perform method steps for providing the archival and retrieval of multiple data streams, said method comprising the steps of:

inputting at least two data streams;

designating at least one archival tag for each of said data streams;

organizing said data streams via the use of at least one archival tag.

* * * * *